Nov. 8, 1955  V. C. KEILY ET AL  2,722,951
BLANKET AND METHOD OF MANUFACTURING
Filed April 23, 1952  3 Sheets-Sheet 1
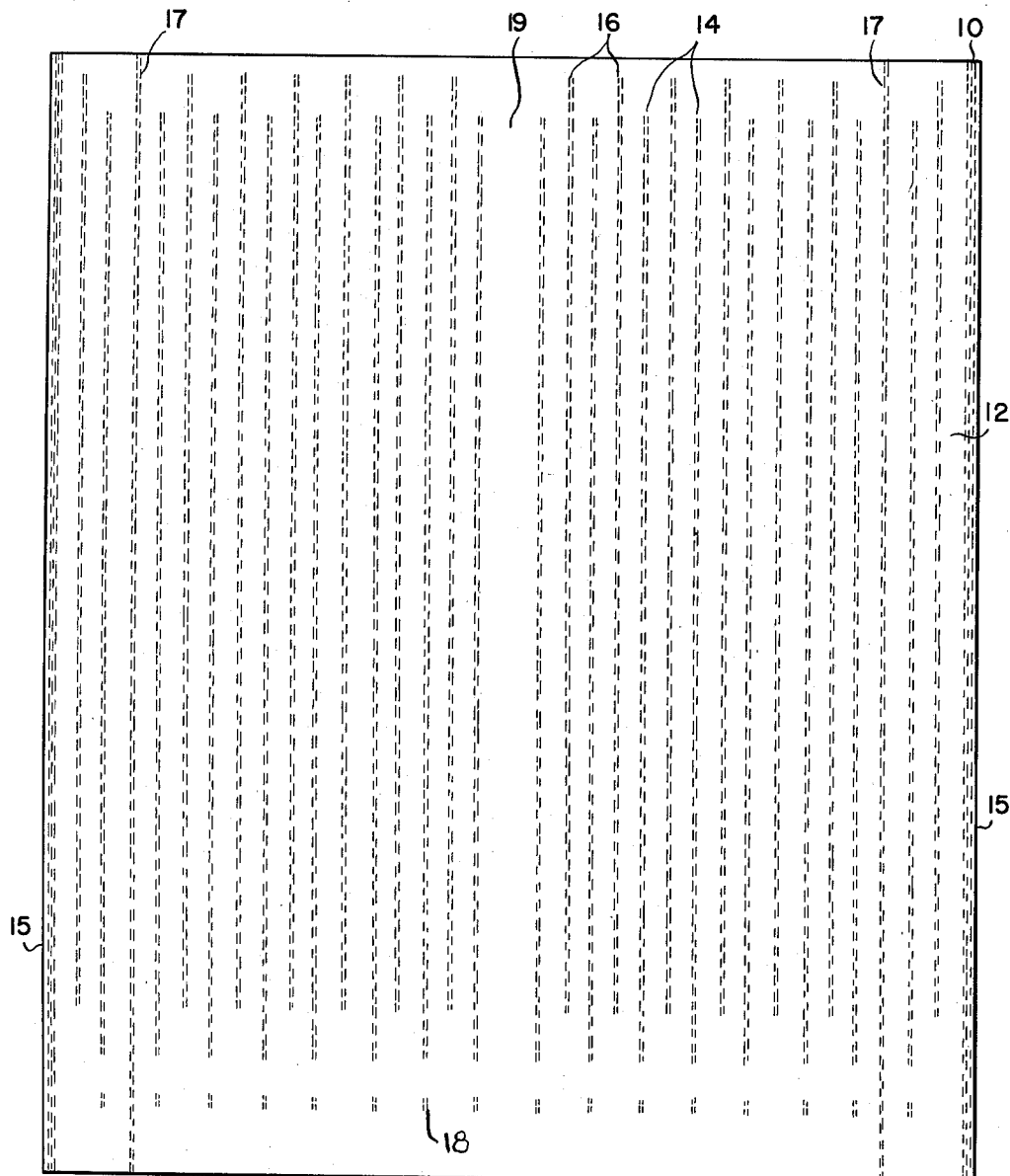
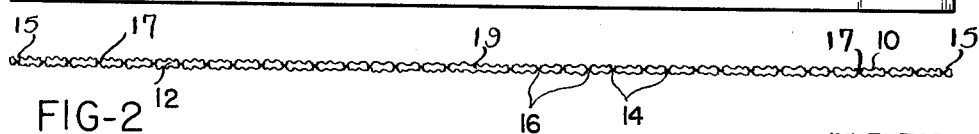
INVENTOR
VINCENT C. KEILY
ADELPHIS J. SMITH
BY
ATTORNEYS Nov. 8, 1955
V. C. KEILY ET AL
2,722,951
BLANKET AND METHOD OF MANUFACTURING
Filed April 23, 1952
3 Sheets-Sheet 2
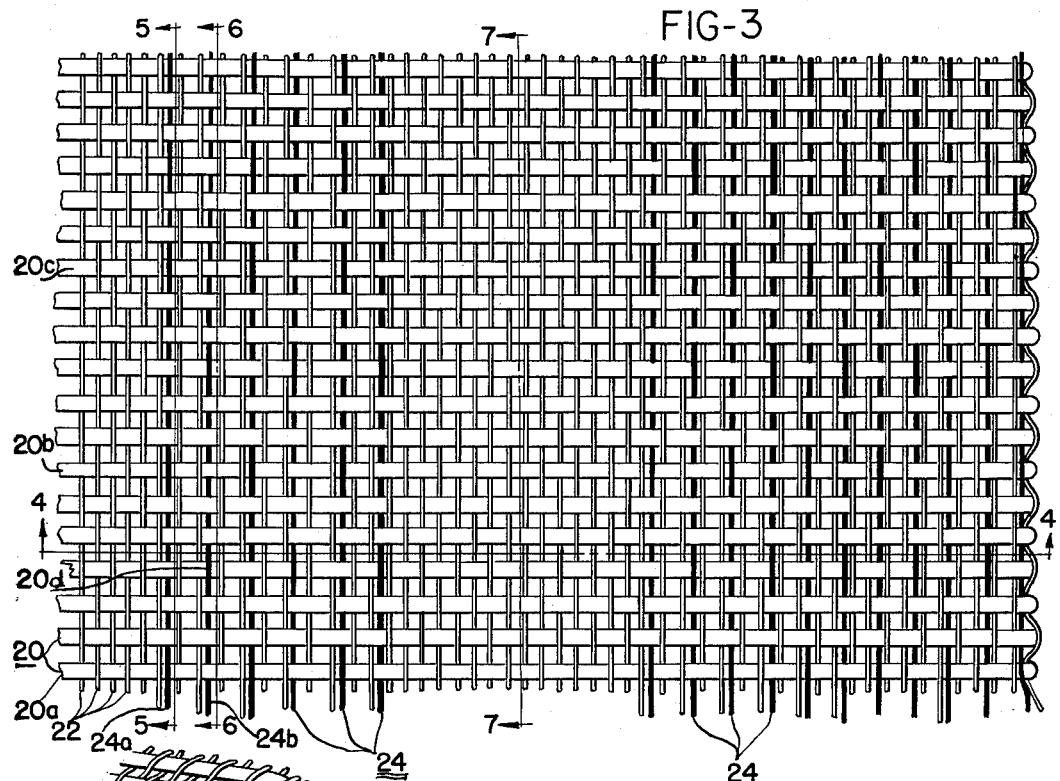
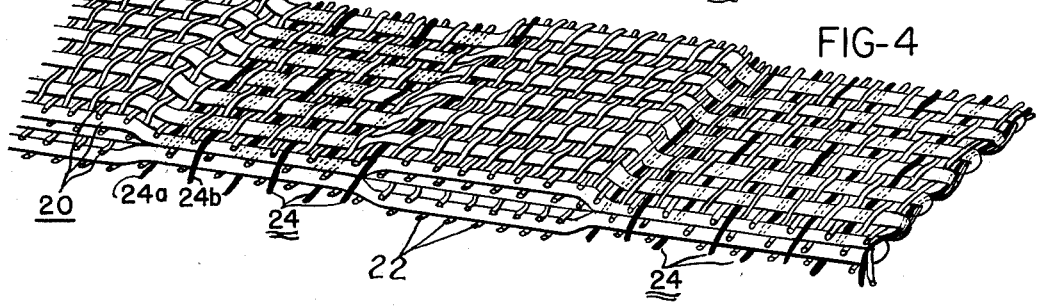
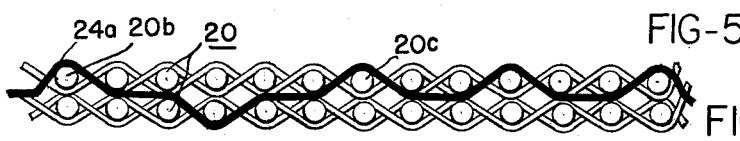
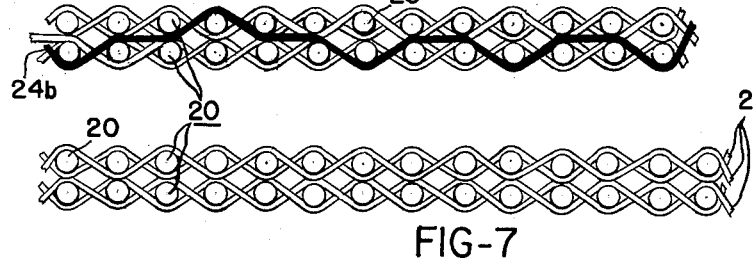
INVENTORS
VINCENT C. KEILY
ADELPHI S.J.SMITH
BY
ATTORNEYS Nov. 8, 1955 V. C. KEILY ET AL 2,722,951
BLANKET AND METHOD OF MANUFACTURING
Filed April 23, 1952 3 Sheets-Sheet 3
FIG-8
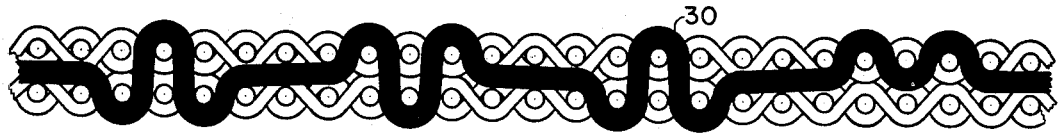
FIG-9
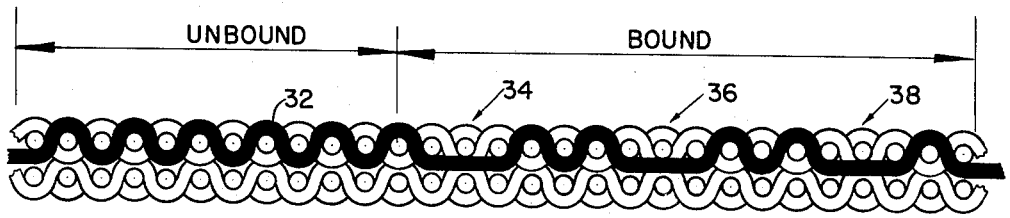
FIG-10
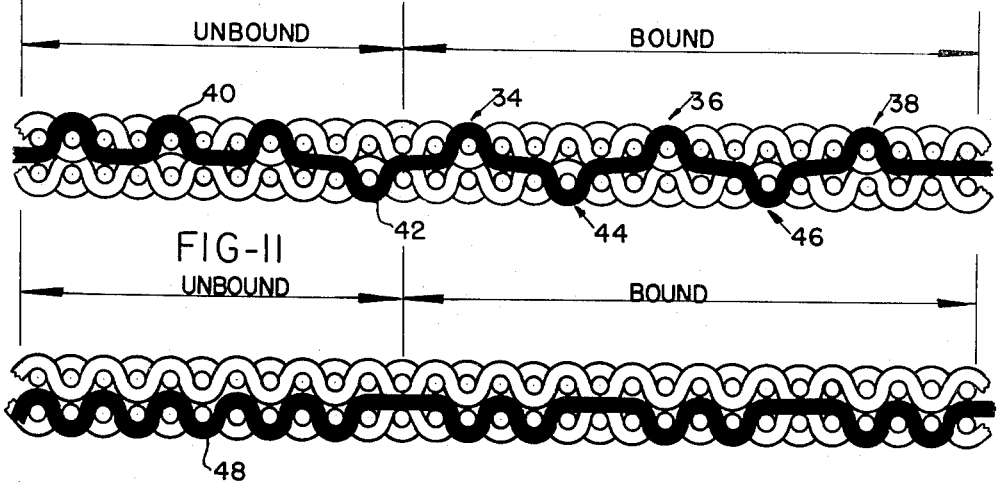
FIG-11
FIG-12
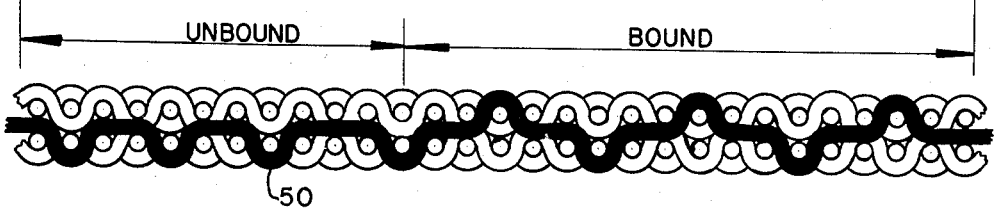
INVENTORS
VINCENT C. KEILY
ADELPHI S J. SMITH
BY Toulmin & Toulmin
ATTORNEYS

United States Patent Office 2,722,951
Patented Nov. 8, 1955

2,722,951

BLANKET AND METHOD OF MANUFACTURING

Vincent C. Keily and Adelphis J. Smith, Piqua, Ohio, assignors to The Orr Felt and Blanket Company, Piqua, Ohio, a corporation of Ohio Application April 23, 1952, Serial No. 283,912

3 Claims. (Cl. 139—410)

This invention relates to blankets, particularly to bed blankets, and especially to blankets of this nature in which an electric heating element can be incorporated.

Electrically heated blankets are well-known and have met with considerable favor, but heretofore have embodied certain drawbacks, such as being very costly, and in the amount of labor required to incorporate the electric heating element in the blanket.

The present invention has to do particularly with an improved blanket construction and a method of making the same in which the drawbacks referred to are eliminated.

A particular object of the present invention is to provide a blanket construction and a method of making the same in which economical production practices can be observed, while at the same time the end result is a blanket adapted for receiving an electric heating element.

A particular object of this invention is to provide a double ply blanket construction that has formed therewith at the time of weaving a plurality of channels for receiving the electric heating element, but the formation of which channels does not in any way detract from the strength or appearance of the finished blanket.

Still another object of this invention is to provide a blanket construction of the nature described comprising a tubular woven blanket including channels for receiving an electric heating element which can be produced in the loom at the time of weaving the blanket, and which requires no further steps after it comes from the loom for forming the said channels.

Still another object of this invention is the use of special warp binder threads to join the plies of the blanket along lines to form channels therein to receive a heating element.

These and other objects and advantages will become more apparent upon reference to the following description taken in connection with the accompanying drawings, in which:

Figure 1 is a plan view more or less diagrammatic of the blanket after it comes from the loom and has been cut to length;

Figure 2 is an end view looking in at one end of the blanket and showing, also diagrammatically, how the channels are situated therein;

Figure 3 is a somewhat enlarged plan view taking in the upper right-hand corner of the blanket illustrated in Figure 1, with the sizes and spacing of the threads exaggerated for the sake of clarity;

Figure 4 is a perspective view, and may be considered as a section taken on line 4—4 of Figure 3 and shows, though not to true scale, how the blanket is composed of alternate lines of binding and channels;

Figure 5 is a sectional view taken on line 5—5 of Figure 3 showing the manner in which alternate of the warp binder threads in a line of binding are employed for tying the two fabric layers together;

Figure 6 is a view like Figure 5, but is taken on line 6—6 of Figure 3 and shows the path which the others of the warp binder threads of the same line of binding take;

Figure 7 is a section indicated by line 7—7 on Figure 3 and shows the appearance of the blanket in the space along one of the channels;

Figure 8 is a view like Figure 5 showing the path which the warp binder thread can take according to a different weaving pattern;

Figure 9 is a view like Figure 7 showing the path of one of the regular warp threads according to a modified weaving pattern;

Figure 10 is a view showing the warp binder thread running adjacent the warp thread in Figure 9;

Figure 11 is a view like Figure 9 but showing the path of a warp thread in the lower ply of the blanket; and Figure 12 is a view like Figure 10 but showing the path of the warp binder thread adjacent the warp thread shown in Figure 11.

Referring to the drawings somewhat more in detail, 10 generally indicates the blanket in Figures 1 and 2, and, as will be seen in these figures, the blanket is formed with a plurality of longitudinally extending channels 12. The blanket is a tubular woven double ply blanket, so that it comprises essentially two separate and distinct layers of fabric. However, at spaced lines along the fabric in the direction of its length, or warp, as it comes from the loom, means are provided for binding the two layers of fabric together, thereby forming channels between the said spaced lines.

According to the present invention, the said spaced lines consist of a first group of lines, indicated at 14, and which will be seen to extend from adjacent the upper or head end of the blanket as it is viewed in Figure 1, to a point spaced a substantial distance from the lower, or foot end of the blanket.

Between the several lines 14 are lines 16 which commence from a point inwardly from the upper end of the blanket and also inwardly from the ends of the lines 14 and extend downwardly, and terminate at points below the lower ends of the lines 14. It will be readily apparent on reference to the drawings that these groups of lines of binding so connect the two fabric plies of the blanket as to produce a tortuous passage through which an electric heating element can be threaded. The upper ends of the lines of binding marked 14 serve as partitions for isolating adjacent runs of the heating element at the upper end of the blanket, whereas the extreme lower ends of the lines of binding marked 16 provides the same function at the lower end of the blanket.

Reference to Figure 1 will indicate that the lines of binding 16 are again picked up for a short distance, as indicated at 18, so that between the short lines of binding marked 18 and the ends of the lines of binding marked 16, there is provided a transversely extending channel in the blanket through which the supply lines for supplying the electric heating element can be led.

Below the short lines of binding 18 at the bottom of the blanket, and above the upper ends of the lines of binding 14, the blanket is, of course, tubular and open, so that the said channels formed by the spaced lines of binding are accessible from either end of the blanket.

In addition to the lines of binding 14, 16, and 18 described above, the blanket is also provided with a line of binding at each selvedge of the blanket, represented by reference numeral 15, and which lines of binding consist of a predetermined number of warp binder threads which are interwoven with the two plies throughout the length of the blanket. There is also provided in the blanket the lines of binding indicated at 17, and which also extend from end to end of the blanket and the warp binders being interwoven with both the plies.

The provision of the lines of binding indicated 17 is so that when the electric heating element is to be incorporated in the blanket, the workman who is to do this work will know exactly where the first channel which is to receive the heating element is located. The heating element in the blanket thus lies between the two spaced lines of binding 17, and the portion of the blanket lying outside these lines receives no heating element.

The lines of binding extending along these outer portions or side edges, however, are important in maintaining the two plies in proper relation to each other, thereby preventing curling or bulging of the blanket throughout its life.

Reference to Figures 1 and 2 will also reveal that in the center of the blanket at 19 there is a double width channel which is provided by merely modifying the spacing of the lines of binding at that point.

The blanket illustrated in Figures 1 and 2 described above is a double blanket, and a single blanket will be made in substantially the same manner, except that the dimensions thereof, at least as to width, will be reduced accordingly, the central double width channel 19 will be eliminated, and the through lines of binding represented by reference numerals 17 in Figure 1 will be disposed farther inwardly for a single blanket than for a double blanket. For example, with a double blanket we have found that the through lines of binding 17 should occur at the fourth line of binding in from each edge, counting the selvedge line of binding as the first, whereas, with a single blanket, the corresponding through lines of binding will occur at the seventh line, again commencing with the selvedge line of binding as line one.

The weaving of the blanket in the described manner is accomplished, in general, by controlling the harness movement in the loom, and a special loom construction and control fully disclosed and claimed in co-pending application Serial Number 292,302 filed, June 7, 1952, in the names of John L. Ramer and Carl Molander, and assigned to the same assignee as the instant application, is of particular merit in this connection.

After the blanket has been produced in the manner described above, it then has the electric heating element incorporated therein by threading the element through the channels, and thereafter the ends of the blanket are bound with a suitable binding, and it is ready for use.

Turning now to the novel manner which we have devised for binding the two fabric plies of the blanket together to give the lines of binding indicated at 14, 15, 16, 17, and 18, reference may be had to Figures 3, 4, 5, and 6.

Referring to Figures 3 through 7, the weft or filler threads are generally indicated by reference numeral 20, and the regular warp threads are generally indicated at 22. It will be noted that the warp threads 22 are distributed substantially uniformly across the width of the blanket and that a standard weaving together of the warp threads 22 and the filler threads 20, such as a basket weave, takes place over the entire blanket.

According to the present invention, there is distributed over the zones along which the two fabric plies of the blanket are to be bound together additional threads extending along the warp and represented generally by reference numeral 24. These warp binder threads are separate from and in addition to the regular warp threads, and their sole purpose is to effect the tying together or binding together of the two fabric plies of the blanket. Due to the closeness of the threads, we have found that good results can be obtained by interweaving each of the warp binders with the filler threads of the separate plies of the blanket at spaced intervals along the binding zone. This simplifies the weaving of the blanket, and, at the same time, provides for strong and adequate binding together of the two plies, while not causing any pulling of the plies or in any way detracting from the appearance thereof.

Making reference now to Figure 3, which shows an area of the blanket along one edge and at the end of a line of binding adjacent thereto, the warp binder 24a at the extreme left side of the line of binding to the left side of Figure 3 will be seen to be passing over the lowermost of the filler threads 20a of the top ply of the blanket, then underneath the next five of the filler threads 20 of the same ply, and then over the next following one of the filler threads of the top ply, marked 20b. Halfway between the filler threads marked 20a and 20b, the warp binder 24a passes under a filler thread in the underneath ply of the blanket and between the points of interweave of the warp binder with the plies of the blanket, it is carried between the plies.

This cycle continues throughout the length of the strip along which the two plies of the blanket are bound together. Beyond the end of the line of binding, and for the remainder of the distance to the beginning of the same line of binding in the next blanket, the warp binder 24a is carried entirely in one ply of the fabric by being interwoven therewith on every third pick.

This is brought out in Figure 3, where it will be seen that the warp binder 24a is interwoven with every third filler thread of the top ply of the blanket commencing with the filler thread marked 20c.

The warp binder next adjacent to warp binder 24a, and which is marked 24b in Figure 3, follows a path similar to the one followed by warp binder 24a, except that where warp binder 24a passes over filler thread 20a of the top ply, warp binder 24b at this point passes beneath the corresponding filler thread in the underneath ply of the blanket. Then, at the point where warp binder 24a passes beneath the filler thread of the underneath ply, which is located three filler threads up from the filler thread 20a, warp binder 24b is passing over the corresponding filler thread in the top ply of the blanket. This point is marked 20d in Figure 3.

The warp binder 24b thus runs along with warp binder 24a, and wherever the one warp binder is interwoven with one ply of the blanket, the other warp binder is interwoven with the other ply of the blanket and between the points of interweave of the warp binders with the plies of the blanket, the said warp binders are carried between the plies.

At the end of the line of binding between the two plies, and which occurs at the filler thread marked 20c, the warp binder 24b, similarly to the warp binder 24a, commences to be interwoven with only one ply of the blanket, and at every third pick therealong, as described in connection with warp binder 24a. Warp binder 24b, however, is carried in the opposite ply of the blanket from warp binder 24a, this being done in order to make the two plies uniform, and to prevent puckering or pulling of the one ply because of both of the warp binders being carried therein.

As will be seen in Figure 3, the two warp binders 24a and 24b which have been described above are a part of a group of six warp binders which are distributed across the width of the line of binding. The path of three of these warp binders, consisting of alternate thereof, follows the path described for warp binder 24a, and the other follow the path described for warp binder 24b.

In the right side of Figure 3, and which represents the selvedge, it will be observed that the warp binders forming the binding along the edge of the blanket consist of two groups of warp binders, with the said binders being interwoven with the plies of the blanket at every third pick therealong, first with one ply and then with the other, and with alternate of the warp binders in this region of the blanket following the same path, while adjacent of the warp binders follow an opposite path, so that, whenever one of the binders is interwoven with one ply, the adjacent one thereto is interwoven with the other ply. The lines of binding along the selvedge of the blanket and also along the lines marked 17 in Figure 1, as mentioned previously, extend the full length of the blanket, and the pattern of the weave along these lines of binding is thus the same throughout the blanket.

The described arrangement for warp binders 24a and 24b will be more clearly seen in Figures 4, 5, and 6.

In Figures 5 and 6 the filler thread marked 20c is the final pick where the two plies are bound together and rightwardly on filler thread 20c in Figure 5 it will be observed that warp binder 24a is interwoven only with the top ply of the blanket, whereas leftwardly of the filler thread 20c, warp binder 24a is interwoven with both of the plies of the blanket.

In Figure 6 it will be observed that rightwardly of filler thread 20c, warp binder 24b is interwoven only with the lower ply of the blanket, whereas leftwardly of filler thread 20c, warp binder 24b is interwoven with both plies of the blanket.

As explained before, a sectional view corresponding to Figures 5 and 6, but taken anywhere along the lines of selvedge binding at the edges of the blanket, or anywhere along the lines of binding 17 of the blanket, would reveal a pattern of interweaving between the warp binders and the two plies of the blanket, as is illustrated leftwardly of filler thread 20c in Figures 5 and 6.

Thus, each of the warp binders extends the length of the blanket between the plies thereof, and at each third pick passes around a filler thread, first in one ply of the blanket, and then in the other, along the zone where the plies are bound together, and each thereafter is interwoven at every third pick with only one ply of the blanket, until the point is reached where it is desired to start another line of binding.

From the foregoing, it will be seen what we have devised is a novel blanket construction, particularly for electric blankets, and a method of making the blanket providing for channels therein for receiving the electric heating element, and which channels are provided at the time of weaving the blanket and without utilizing any of the regular warp threads for effecting the binding together of the two plies of the blanket.

The blanket produced in accordance with our invention may, of course, be varied as to pattern according to well-known practices, the upper and lower plies of the blanket can be made to have different characteristics according to the individual preference of the producer, and, after completion, the blanket may be napped or otherwise treated according to standard procedure in the art.

When the electric heating element is to be incorporated in the blanket, and which is done after the blanket has been cut to length, as illustrated in Figure 1, the workman locates the first channel that is to receive the heating element by opening the blanket at one of its tubular ends, whereupon the line of binding 17 will immediately indicate the channel through which the heating element is to pass first. After the heating element has been completely threaded through the channels provided in the blanket in accordance with this invention, the blanket is then bound at its opposite ends, and atfer the electric heating element has been connected in circuit with the controls therefor, the blanket is completed.

It is to be understood that the weaving arrangement for the blanket described above is only one of several patterns that can be employed within the scope of this invention. For example, in Figure 8 there is illustrated a warp binder thread 30 which follows a path where at each point along the blanket where it is interwoven with both of the plies, it passes twice through one ply and once through the other, with the adjacent points of interweave being inverted relative to each other. This nature of weave has been found to be satisfactory and can readily be accomplished in ordinary looms.

The weaving arrangement illustrated in Figures 3 through 6 is characterized by adjacent of the warp binder threads in any one line of binding following respectively different paths, whereby separate harness frames are required for said adjacent binder threads. Thus, according to the weaving patterns of Figures 3 through 6, each different type of binding requires two harness frames.

Since, as illustrated in Figure 1, there are three types of binding in the blanket, it follows that six harness frames are required.

With four harness frames being utilized for each ply of the blanket for carrying the regular warp threads, it will be seen that the blanket as in Figures 1 through 7 requires a total of fourteen harness frames. Inasmuch as it may be desired under certain circumstances to provide for more types of lines of binding than is utilized in the described blanket, a still different weaving arrangement within the scope of this invention is illustrated in Figures 9 through 12, and wherein only a single harness frame is required for each different type of line of binding.

It will be apparent that whenever all of the binder threads of any one line of binding are carried in a single harness frame, the points where the said warp binders are interwoven with each ply will coincide, rather than being staggered as in the arrangement of Figures 1 through 6. Because of this concentration of the point where the warp binder threads are interwoven with each ply, it is preferable that the regular warp threads at this point be carried between the plies, thereby eliminating pulling or puckering of the blanket.

Reference now to Figure 9 will indicate in solid lines a regular warp thread 32 which follows the usual regular weaving pattern over that portion of the blanket which is indicated as unbound, whereas, over that portion of the blanket which is indicated as bound, and which means that the warp binder thread in that zone is interwoven with both plies, the warp thread 32 is carried between the plies at the picks indicated by reference numerals 34, 36, and 38.

The warp binder thread adjacent warp thread 32 in Figure 9 is indicated at 40 in Figure 10, and in the unbound section of the blanket, this warp binder thread may be interwoven with only a single one of the plies of the blanket, for example, the top ply, whereas, in the bound section, it is interwoven with the lower ply at the picks marked 42, 44, and 46, and also with the upper ply at picks 34, 36, and 38, which were referred to in connection with Figure 9.

It will also be apparent that the warp binder thread 40 in the unbound section could be carried entirely between the two plies, if so desired.

Figures 11 and 12 are views correspoding to Figures 9 and 10, respectively, except that Figure 11 illustrates the path of a warp thread 48 in the lower ply, and Figure 12 illustrates the path of an adjacent warp binder thread 50 and which normally pertains to the lower ply of the blanket in that it is carried therein along the unbound section of the blanket.

Warp binder thread 50 may also be carried between the plies of the blanket along the unbound section thereof, as explained in connection with warp binder thread 40.

It will be noted in Figures 11 and 12 that the points of interweave of the warp binder thread 50 with the lower ply of the blanket correspond to those points along the blanket where the regular warp thread 48 is carried between the plies of the blanket, as mentioned in connection with Figure 9.

From the foregoing, it will be evident that we have provided a novel weaving pattern for a blanket, and a method of weaving a blanket or similar textile products such that improved results obtain, and which can be carried out on any type of automatic loom or manually.

It will be understood that this invention is susceptible to modification in order to adapt it to different usages and conditions, and, accordingly, it is desired to comprehend such modifications within this invention as may fall within the scope of the appended claims.

We claim:

1. A tubular woven blanket structure having formed therein between the plies a series of channels for receiving an electric heating element, said channels being formed by means binding the two plies of the fabric together along lines spaced across the width of the blanket and extending in the direction of the length thereof, and with the ends of the lines spaced inwardly from the ends of the blanket structure, said means comprising a plurality of warp binders extending along each of the said lines separate and independent from the regular warp threads of the fabric and each warp binder being interwoven with each of the said plies at spaced points therealong at intervals greater than that of successive picks, the points of interweaving of each warp binder with each of the plies of fabric being in the opposite ply in relation to the corresponding points of interweave of the next adjacent warp binder, and said warp binders being carried between plies between said spaced points of interweave.

2. A tubular woven blanket structure having formed therein between the plies a series of channels for receiving an electric heating element, said channels being formed by means binding the two plies of the fabric together along lines spaced across the width of the blanket and extending in the direction of the length thereof, said means comprising a plurality of warp binders extending along each of the said lines separate and independent from the regular warp threads of the fabric, each warp binder being interwoven with each of said plies at spaced points along the length of the blanket, said spaced points being at intervals greater than that of successive picks, said warp binders being carried between plies between said spaced points of interweave, and the points of interweave of each warp binder with each ply of the blanket being staggered relative to the points of interweave of the next adjacent warp binder with the same ply.

3. The method of making a double-ply blanket with channels therein to receive an electric heating element, said method comprising weaving the two plies simultaneously and with separate warp threads so that the plies are independent, binding the plies together along lines extending in the direction of the warp thereof by warp binder threads separate from and in addition to the warp threads of both plies, delivering the warp binder threads from the same warp beam as said warp threads and thus under the same tension, interweaving the warp binder threads with the weft threads of each of said plies at intervals greater than that of successive picks, and staggering the points of interweave of each binder with the plies relative to the corresponding points of interweave of the next adjacent binder.

References Cited in the file of this patent

UNITED STATES PATENTS

| | | |
|---|---|---|
| 1,273,815 | Bicknell | July 30, 1918 |
| 2,203,918 | Moberg | June 11, 1940 |
| 2,250,261 | Goldsmith | July 22, 1941 |
| 2,327,756 | Adamson | Aug. 24, 1943 |
| 2,357,164 | Berg | Aug. 29, 1944 |
| 2,423,910 | Snow et al. | July 15, 1947 |
| 2,432,785 | Moberg | Dec. 16, 1947 |
| 2,502,101 | Morgan et al. | Mar. 28, 1950 |
| 2,632,480 | MacIntyre | Mar. 24, 1953 |

FOREIGN PATENTS

| | | |
|---|---|---|
| 457,729 | Great Britain | Dec. 4, 1936 |